INVENTOR
William L. Hollander

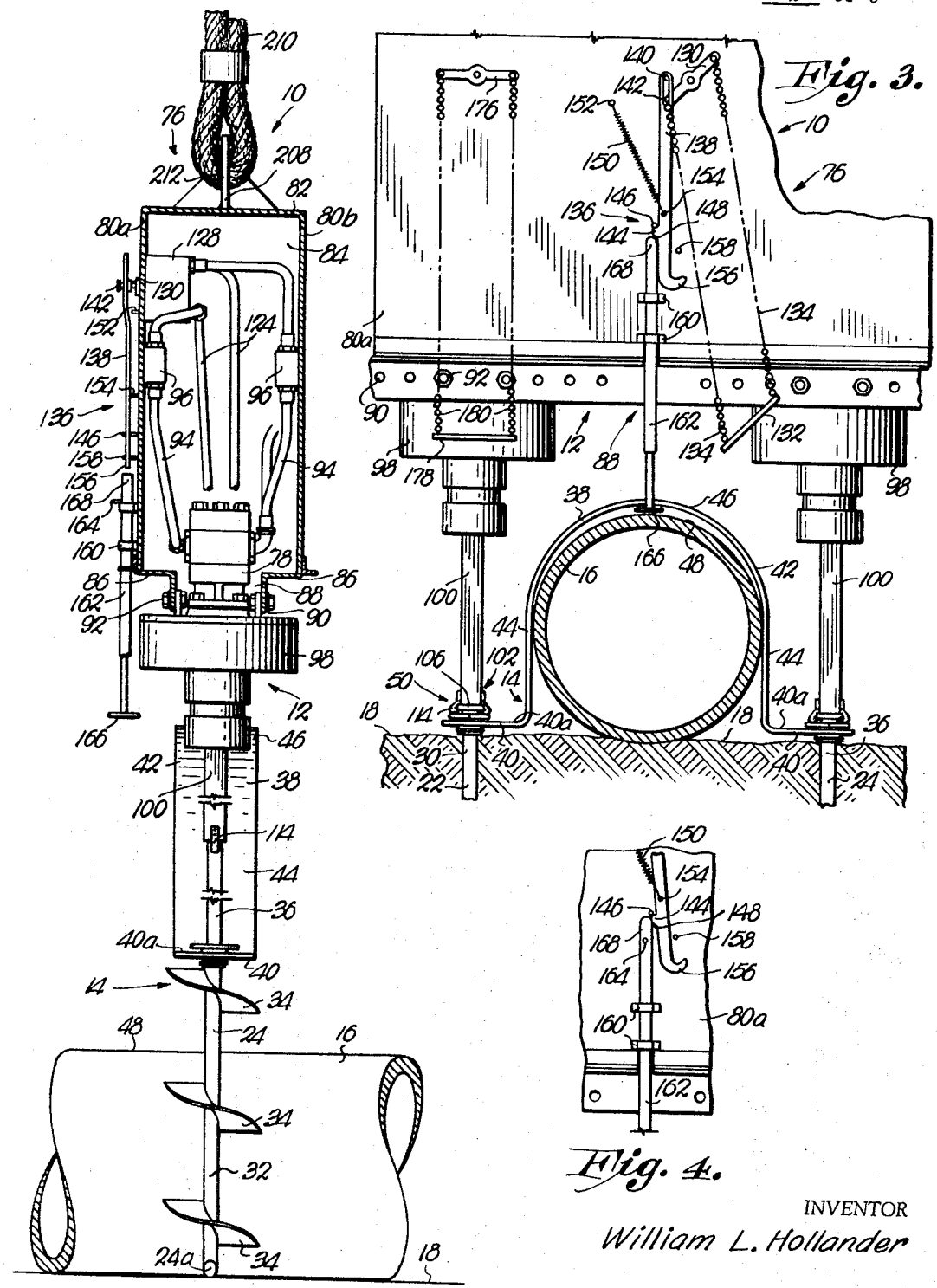

INVENTOR
William L. Hollander

BY Hovey, Schmidt, Johnson & Hovey
ATTORNEYS

United States Patent Office 3,427,812
Patented Feb. 18, 1969

3,427,812
METHOD AND APPARATUS FOR ANCHORING OFFSHORE PIPELINES
William L. Hollander, Centralia, Mo., assignor to A. B. Chance Company, Centralia, Mo., a corporation of Missouri
Filed July 13, 1966, Ser. No. 564,872
U.S. Cl. 61—72.3
Int. Cl. F16l 1/00
37 Claims

ABSTRACT OF THE DISCLOSURE

An underwater pipe anchoring device having pipe-spanning structure engages a pipe and holds the pipe in position by a pair of spaced depending screw anchors provided with oppositely inclined helixes for engagement with the earth in the vicinity of the pipe. Power means rotates the screw anchors simultaneously in opposite directions of rotation. A method secures the pipe using a device, senses the proximity of holding structure of the device to the pipe as the anchors are oppositely rotated and discontinues the rotation when the structure firmly anchors the pipe.

---

The instant invention relates to a method and apparatus for use in the construction of underwater pipelines and, more particularly, to a method and apparatus for anchoring pipe to the earthen surface underlying a body of water.

Pipelines traversing large expanses of water are necessary for communicating offshore wells with the mainland and for transportation of substantial quantities of fluid products between processing centers separated by bodies of water such as lakes, rivers, swamps, oceans, or the like. Long lengths of pipe are flexible and require at least minimal support and thus, the pipelines traversing such expanses of water are preferably laid along the earthen surface or floor underlying the water. Gases, and even most liquid petroleum products, are less dense than water and as a result, pipelines filled with such fluids, and particularly large diameter pipelines, may have a tendency to float. As a result, in the past, it has been a generally accepted practice to use heavy walled pipe (often heavier than the pressure of the fluid would require) provided with a concrete coating to produce a specific gravity of approximately 1.4 which was considered to be sufficient to protect the pipeline against any conceivable eventuality.

Heavy walled pipe and concrete coatings, of course, are expensive to install and maintain. Additionally, it has been noted that hurricanes are capable of producing currents even at depths of 200 feet, which are sufficiently strong to cause shifting of the pipeline and often breakage thereof as a result of the stresses which stem from the shifting of the pipe. It has been suggested that the pipeline could be laid in a trench dug in the earthen surface underlying the particular body of water; however, this would not preclude the use of weighted pipe and would increase the cost of the installation even further.

It is, therefore, the primary object of the instant invention to provide a method and apparatus for installing an underwater pipeline wherein the latter is anchored to the earthen surface underlying the body of water so that shifting and floating of the pipe is precluded without use of weighted pipe or trenches.

As a corollary to the foregoing object it is a very important aim of the instant invention to provide an underwater pipe anchoring method and apparatus permitting the use of screw anchors whereby the pipeline may be securely anchored against the earthen surface.

Underwater pipelines are installed by divers operating under water. Diving operations are expensive to maintain and divers are hampered in their movements, not only by their heavy environmental suits, but also by the resistance to movement inherent in the water. Additionally, underwater pipelines are ordinarily of a size which necessitates the use of heavy and powerful installation equipment. An extremely important object of the instant invention therefore, is to provide a method and apparatus for underwater pipeline installation wherein air is entrapped at a submerged level to provide buoyant support for the installation equipment causing the same to have a greatly reduced, effective underwater weight to the end that easy handling thereof by a diver is permitted.

Another extremely important object is the provision of pipe-anchoring apparatus and a method for operating the same, wherein a pair of screw anchors may be installed simultaneously whereby installation is expedited. In this respect, it is also an important aim of the invention to provide pipe-spanning structure adapted to extend across the pipe and be held tightly in place by screw anchors on opposite sides of the pipe wherein the structure and the anchors comprise a unitary assembly constructed prior to submersion.

Yet another extremely important object of the instant invention is to eliminate the requirement for supporting an underwater screw anchor rotating apparatus against rotational torque by causing the same to simultaneously rotate a pair of anchors having oppositely inclined helixes in opposite directions whereby the rotational torque of one anchor is offset by the rotational torque of the other anchor.

As mentioned above, divers are hampered in their movements, and additionally, their vision is often impaired by murky water; therefore, it is an important object of the present invention to provide automatic shutoff mechanism for the motors driving the anchors. Further, to aid the diver in the performance of his duties, it is desirable to couple the anchor and bracket assembly to the anchor-driving apparatus above water, and it is another important object hereof to provide automatic uncoupling means whereby the apparatus is freed from the assembly as soon as the latter is firmly in place against the pipe.

Yet another important object of the instant invention is the provision of a method for maintaining the work ship above the pipe being secured so that equipment and materials lowered to the diver will be readily accessible to him.

In addition to the foregoing objects, it is an extremely important aim of the present invention to provide underwater screw anchor driving apparatus having motor controls and buoyancy controls which are operable by the diver whereby precise placement of the anchors is permitted.

Another important aim of the invention is the provision of an underwater pipe-anchoring apparatus and a method for operating the same wherein is included hydraulic means for rotating the anchors and pneumatic means for controlling the buoyancy thereof, whereby the apparatus is substantially free for underwater movement and control by a diver.

Still another important aim of the invention disclosed herein is the provision of control means for the pneumatic buoyancy system permitting flooding of the chamber during rotation of the anchors to the end that the entire weight of the apparatus may be applied as a downward force for assisting the helixes in driving the anchors into the earthen surface.

Other important objects and details of the present invention will become obvious or be described in greater detail as the following specification progresses.

In the drawings:

FIG. 2 is a side elevational view of the apparatus illustrated in FIG. 1, again with parts broken away for clarity;

FIG. 3 is a partial front elevational view of the apparatus depicting the disposition of certain components thereof just prior to the time when the anchors will be fully driven into the earthen surface;

FIG. 4 is a partial front elevational view of the apparatus showing the action of the automatic motor control shutoff at a time shortly after that depicted in FIG. 3 and just prior to the time motor shutoff will be effected;

Figure 5:
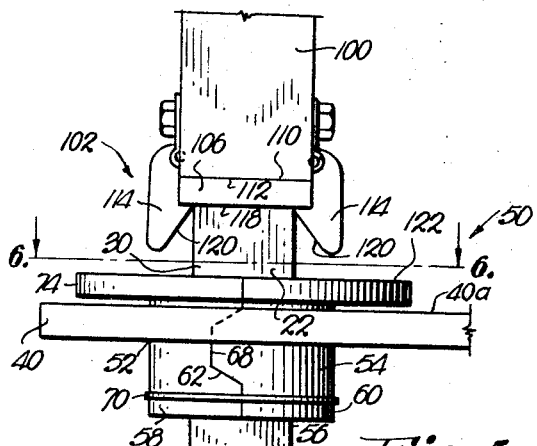
FIG. 5 is an enlarged detail view illustrating the components mounting an anchor on a corresponding bracket flange and releasably coupling the anchor to a corresponding drive shaft.
Figure 7:
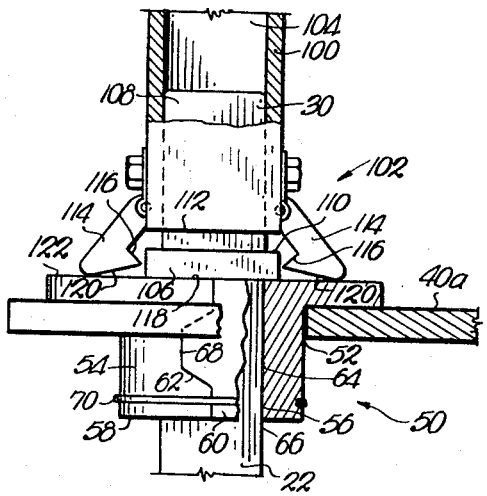
Figure 8:
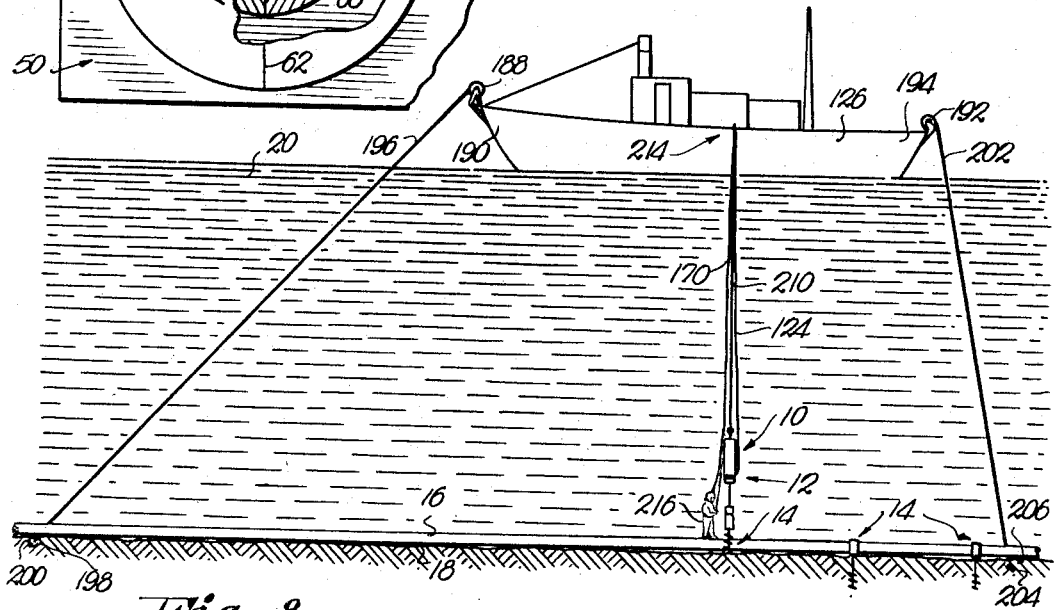

FIG. 7 is an enlarged detail view similar to FIG. 5 showing the disposition of certain parts after the anchor has been released from the corresponding drive shaft, certain parts having been broken away to reveal details of construction; and FIG. 8 is a schematic view of greatly reduced scale depicting the relative positions of the pipe to be anchored, the work ship, the anchoring apparatus and the diver manipulating the latter.

An apparatus for securing a pipe to the earthen surface underlying a body of water and embodying the concepts of the instant invention is broadly designated by the numeral 10. Apparatus 10 includes an anchor-driving device or driver, broadly designated by the numeral 12, and an anchoring assembly 14 adapted to be coupled to device 12 and driven thereby into a position for holding a pipe 16 tightly against an earthen surface 18 underlying a body of water 20. It is to be understood that the body of water 20 may be an ocean, a lake, a river, a swamp, or any other such body of water to be traversed by a pipeline.

Figure 1:
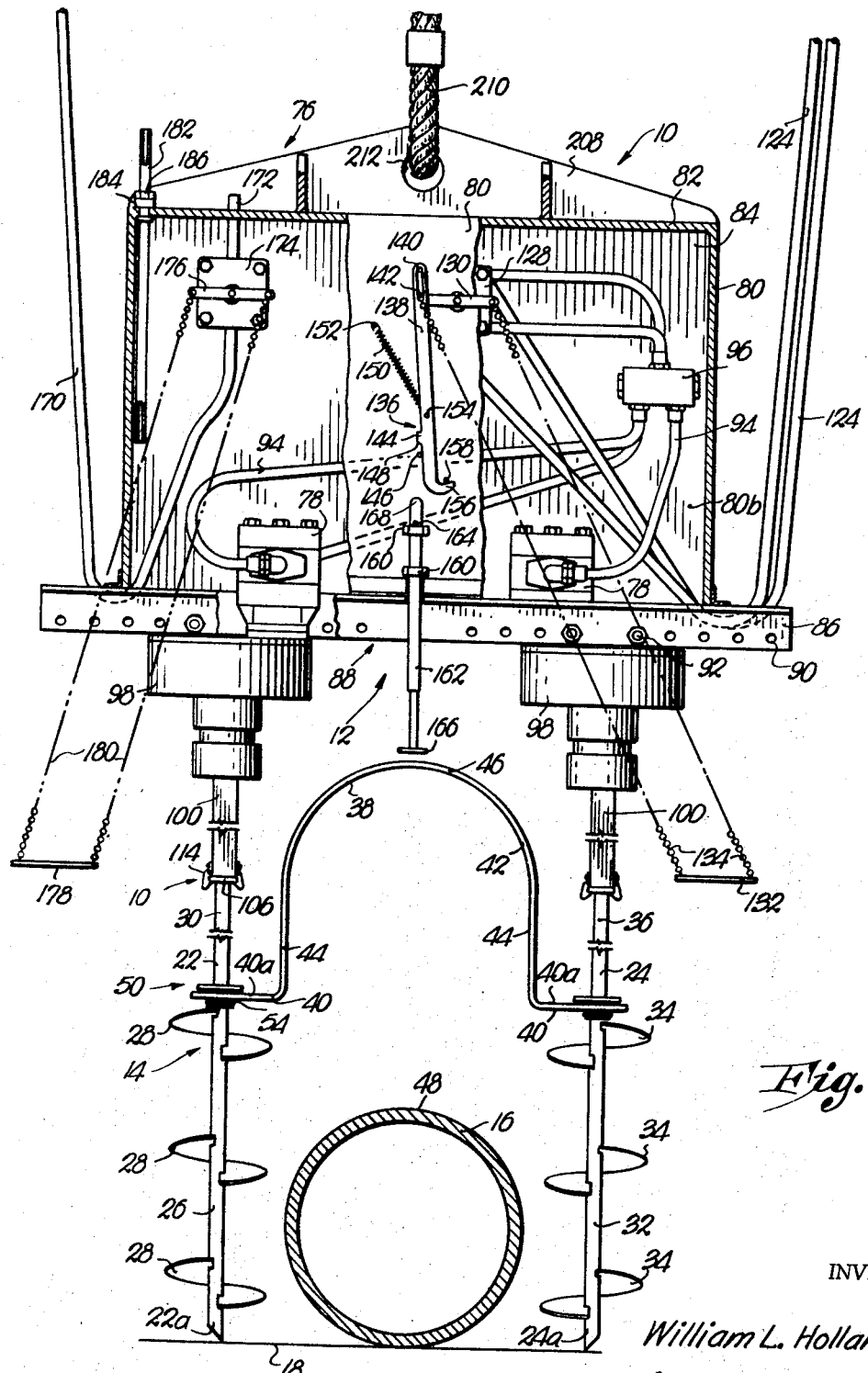
FIG. 1 is a front elevational view of an apparatus for anchoring a pipe to the earthen surface underlying a body of water embodying the principles of the invention and including an anchor-driving device and a releasable anchor assembly, certain parts having been broken away to provide increased clarity.

Assembly 14 includes a pair of spaced-apart screw anchors 22 and 24 which are shown in FIG. 1 in the preferred, substantially parallel relative positions. In this respect, those skilled in the art will readily understand and appreciate that the anchors 22 and 24 do not necessarily have to be maintained in parallelism. For example, each could be inclined at an angle and directed into the earthen surface 18 in a direction to dispose their free ends 22a and 24a beneath pipe 16.

Anchor 22 has a normally lowermost portion 26 mounting a series of helixes 28, and a shank portion 30 extending upwardly from the helix-mounting portion 26 in coaxial alignment therewith. Anchor 24 has a normally lowermost portion 32 mounting a series of helixes 34, and a normally uppermost shank portion 36 extending generally upwardly in coaxial alignment with the helix-mounting portion 32. Anchors 22 and 24 are generally identical except for the inclination of the helixes 28 and 34 which are inclined in opposite directions permitting the anchors 22 and 24 to be rotated in opposite directions during driving of the same into the surface 18. Preferably, a series of longitudinally spaced helixes, such as 28 and 34, are used because multiple helix anchors have been found to exhibit great holding power in the type of saturated clays found at the bottom of an ocean; however, it is to be understood that other types of screw anchors such as, for example, those having a continuously spiraled helix, have utility and may be utilized without deviating from the principles of the present invention.

Pipe-scanning structure in the nature of an elongated bracket member 38 spans the distance between the anchors 22 and 24 and has a flange 40 extending outwardly from each end thereof mounting a respective one of the anchors 22 or 24. Bracket 38 includes a U-shaped, central section 42 disposed between flanges 40 and having a pair of spaced-apart, substantially parallel legs 44 and an arcuate bight 46 interconnecting legs 44. Bight 46 is configured, as can be seen in FIG. 3, to complementally engage the outer surface 48 of pipe 16 with the legs 44 extending downwardly therefrom on opposite sides of pipe 16 so that the flanges 40 are located in close proximity to the earthen surface 18 and extend laterally thereon in opposite directions away from pipe 16.

Figure 6:
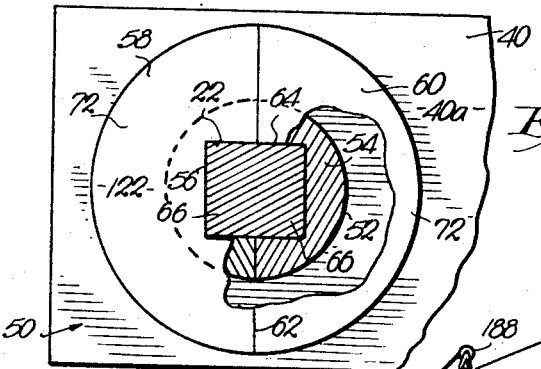
FIG. 6 is a sectional view taken along line 6—6 of FIG. 5.

Separate mounting means 50 is provided for mounting each of the anchors 22 and 24 on a respective flange 40. Mounting means 50 is identical in each case and, therefore, only one will be described in detail. Viewing FIGS. 5 and 6, it can be seen that flange 40 has a circular opening 52 therein receiving the shank portion 30 of anchor 22. Shank portion 30 is transversely polygonally shaped and preferably square so that the same can be easily manufactured from bar stock and for a purpose to be described hereinafter.

A sleeve 54 is disposed within opening 52 and has an aperture 56 therein complementally receiving shaft 22. Sleeve 54 includes a pair of sections 58 and 60 disposed on either side of shank 30. Sections 58 and 60 have complementally mated surfaces 62 and a series of walls 64 defining a recess 66 in each surface 62. Recesses 66 are disposed in opposed relationship and define aperture 56.

Sections 58 and 60 have complementally mated tongue and groove surfaces 68, and a snap ring 70 is provided to maintain sections 58 and 60 in fixed relative positions. Outwardly extending flanges 72 at the normally uppermost extremity of each section 58 and 60 present a continuous annular lip 74 having a larger diameter than the opening 52. Lip 74 is disposed to engage the upper surface 40a of flange 40, and the snap ring 70 is disposed to engage the lower surface 40b thereof to maintain sleeve 54 within opening 52. Annular lip 74 serves another purpose to be described in detail hereinafter.

Device 12 includes support means in the nature of an inverted diving bell 76 and motor means in the nature of a pair of hydraulically actuated motors 78. Support means 76 includes a housing having sidewalls 80 and a top wall 82 disposed to present a chamber 84 therewithin. Support means 76 is generally oblong, as can be seen in FIG. 1, and a pair of angles 86 extend longitudinally thereof along the lower edges of the front and rear sidewalls 80a and 80b. Angles 86 are spaced apart presenting an opening 88 therebetween. Thus, chamber 84 is open at the bottom thereof.

Angles 86 are provided with a longitudinally extending series of bolt holes 90 and a plurality of nut and bolt means 92 are provided for mounting the motors 78 in adjustably spaced-apart relationship longitudinally of angles 86. Thus, pipes such as 16 of various diameters may be accommodated. Hydraulic fluid lines 94 operably couple motors 78 with a manifold 96. Each motor 78 has a gearbox 98 from which a drive shaft 100 extends in a normally downward direction.

Separate coupling means 102 is provided for coupling each drive shaft 100 to the shank portion 30 or 36 of a respective anchor 22 or 24. Each of the coupling means 102 is identical and, referring to FIGS. 5, 6 and 7, only one will be described in detail. Drive shaft 100 is tubular and is provided with a transversely polygonally-shaped, central bore 104 complementally receiving the normally uppermost end of shank 30 therewithin. Shank 30 and bore 104 are shown having a transversely square configuration; however, their transverse configurations may take any form which provides a pair of complementally mated wrench flats. A uniform and symmetrical transverse configuration is desirable primarily from a practical standpoint for economical manufacturing thereof from readily available bar stock.

A head 106 is disposed adjacent the normally uppermost end of shank 30, and a small length 108 extends beyond head 106 and is normally received within bore 104 with the top surface 110 of the head in engagement with the bottom surface 112 of shaft 100. A pair of hooks 114 are pivotally mounted on shaft 100 and each has a tab 116 normally disposed to engage the lower surface 118 of head 116. Each hook 114 has a camming surface 120 disposed to engage the upper surface 122 of lip 74 as anchor 22 becomes fully driven into surface 18.

Motors 78 and lines 94 are arranged so that the drive shafts 100 and anchors 22 and 24 are rotated in opposite directions. Hydraulic fluid lines 124 are connected to a source of hydraulic fluid (not shown) which is located on a work ship 126. Control mechanism in the nature of a 3-way valve 128 is disposed in lines 124 for controlling the flow of fluid to the manifold 96.

Manifold 96, preferably, has internal flow dividers provided with pressure compensating mechanism whereby the drive shafts 100 are caused to rotate at substantially the same speed, irregardless of the resistance to rotation encountered by either of the anchors 22 or 24. This feature is desirable so that the anchors will be driven into the surface at substantially the same longitudinal rate of movement. The valve 128 has internal shiftable port mechanism (not shown) which is shifted by a lever element 130.

Lever 130 (viewing FIG. 1) is shown in its neutral or motor "Off" position. Element 130 is shifted in a counterclockwise direction into a forward drive motor "On" position as illustrated in FIG. 3. Element 130 may also be rotated in a clockwise direction into a motor reversing position if it becomes necessary to reverse the rotation of the anchors for any reason. Motor control structure in the nature of a handle 132 is disposed in spaced relationship with respect to the support means 76 and is connected to opposite ends of element 130 by a pair of chains 134. Thus, by pulling downwardly on the left-hand end of handle 132, element 130 is shifted in a counterclockwise direction. Latch means 136 is provided for maintaining the element 130 in the forward drive motor "on" position thereof. Latch means 136 comprises an elongated, Y-shaped arm 138 having a longitudinally extending, elongated slot 140 at the normally uppermost end thereof. A pin 142 extends laterally from the right-hand end of element 130 and is received in slot 140. A centrally located tab 144 extends laterally from arm 138 and is disposed for engagement with a peg 146 extending outwardly from the front sidewall 80a. An inclined surface 148 on tab 144 is disposed to engage peg 146 as arm 138 is shifted downwardly by a counterclockwise shifting of element 130.

An elongated spring 150 extends from a stub shaft 152 disposed to the left of arm 138 and above peg 146 and is connected to arm 138 as at 154. Thus, viewing FIG. 1, it can be seen that spring 150 exerts a force on arm 138 for urging the latter to swing in a clockwise direction about pin 142 and to shift upwardly until the pin 142 is disposed in the lowermost portion of slot 140. A laterally extending tip 156 on the lowermost end of arm 138 is disposed to engage a peg 158 and limit the upward movement of arm 138 under the influence of spring 150 so that, at the time tip 156 engages peg 158, slot 140 will permit element 130 to remain in its motor "Off" position. It can be seen that slot 140 permits manual actuation of element 130 into its motor reversing position because pin 142 may shift upwardly in slot 140 relative to arm 138.

A pair of brackets 160 extend forwardly from wall 80a and mount a pipe sensor 162 for vertical, longitudinal shifting. A pin 164 extends laterally from sensor 162 and is disposed to engage the upper bracket 160 and maintain sensor 162 in dangling relationship with respect to support means 76. Sensor 162 has a foot 166 disposed to engage the upper surface of pipe 16 as anchors 22 and 24 become fully driven into the earthen surface 18. The engagement between foot 166 and pipe 16 causes sensor 162 to shift upwardly in brackets 160, and the upper end 168 of the sensor is disposed to engage the inclined camming surface 148 on tab 144.

A conduit 170 is carried by support means 76 and is coupled with a source of high pressure air (not shown) disposed on ship 126, and a vent pipe 172 extends upwardly through top wall 82. Conduit 170 and vent pipe 172 are coupled with control means in the nature of a 3-way valve 174 which has a port communicating with the interior of chamber 84. Valve 174 has internal, shiftable port elements which are shifted by a lever 176 between a bleed or air-out configuration with valve 174 communicating chamber 84 with pipe 172, an air-in position with valve 174 communicating chamber 84 with conduit 170, and a hold position located between the air-in and the air-out positions with valve 174 blocking both conduit 170 and pipe 172. Remote structure in the nature of a handle 178 is disposed in spaced relationship with respect to support means 76 and is connected to lever 176 by a pair of weighted chains 180. A downward pull on the left-hand end of handle 178 causes a counterclockwise rotation of lever 176 and a downward pull exerted on the right-hand end of handle 178 results in a clockwise rotation of lever 176.

Support means 76 is provided with an adjustable, elongated standpipe 182 extending through an opening 184 in top wall 82. Adjustable packing means 186 mounts pipe 182 in opening 184 and permits pipe 182 to be shifted vertically when the packing means is loosened.

Viewing FIG. 8, work ship 126 has a sheave 188 at the bow thereof and another sheave 192 disposed on the aft section 194 thereof. A cable 196 extends forwardly and downwardly from sheave 188 and a sea anchor 198 at the free end of cable 196 is disposed at a zone 200 on earthen surface 18 adjacent pipe 16 and in front and generally forward of the ship. Another cable 202 extends rearwardly and downwardly from sheave 192, and a sea anchor 204 on the free end of cable 202 contacts a zone 206 on surface 18 adjacent pipe 16 and behind ship 126.

Support means 76 is provided with a transverse bracket 208 mounted on the upper wall 82 which is adapted to be carried by a cable 210 passed through opening 212 in bracket 208. The opposite end of cable 210 is attached to wench mechanism broadly designated by the numeral 214 which is located on the deck of ship 126. Thus, apparatus 10 may be lowered from ship 126 into a position generally overlying pipe 16 where the handles 132 and 178 are accessible to a diver 216 as is best illustrated in FIG. 8.

*Operation*

By viewing FIG. 8, it may be seen that pipe 16 is secured to earthen surface 18 by a plurality of anchoring assemblies 14 disposed at spaced locations along pipe 16. The longitudinal distance between assemblies 14 is predetermined, and a mark is painted on the pipe designating an anchor location before the pipe is submerged. Diver 216 manipulates apparatus 10 to install an assembly 14 and then, the driver 12 is lifted back aboard ship 126 where a new assembly 14 is attached thereto. In the meantime, cable 196 is reeled in and cable 202 is played out so that ship 126 will be positioned approximately above the location where the next assembly 14 is to be installed. After the new assembly 14 is attached to the driver 12, apparatus 10 is again lowered and diver 216 manipulates the same into the correct anchoring disposition and begins the anchor driving operation. Connecting means 102 and mounting means 50 have component parts which are designed to permit rapid construction of the assembly 14 and quick connection of the same to the driver 12.

Head 106 of shank 30 is configured to fit easily through opening 52 in flange 40. After head 106 of anchor 22 has been passed through opening 52, sections 58 and 60 are installed with the recesses 66 encompassing opposite sides of shank 30. Snap ring 70 is installed and it can be seen, viewing FIGS. 5, 6 and 7, that shank 30 is permitted to shift longitudinally in the square aperture 56 in sleeve 54 presented by recesses 66 in the sections 58 and 60. Also, it can be seen that sleeve 54 is free to rotate in opening 52 and the square shank 30 will rotate therewith. Length 108 of shank 30 is inserted into the complementally configured bore 104 and moved inwardly thereof until head 106 contacts the camming surfaces 120 of hooks 114. The latter are shifted outwardly by the action of head 106 on camming surfaces 120, permitting head 106 to pass. After head 106 engages the lower surface 112 of drive shaft 100, hooks 114 are permitted to gravitate into a position with tabs 116 underlying head 106. Thus, anchoring assembly 14 is releasably connected to the driver 12.

After assembly 14 is constructed and the same is releasably connected to driver 12, apparatus 10 is lowered over the side of ship 126 with cable 210. In this respect, it is to be understood that anchors 22 and 24 extend downwardly from support means 76 and space 88 communicates chamber 84 with the body of water 20. Apparatus 10, as can be recognized, is quite large and the dry weight or actual weight is sufficient to render the same unmanageable by a single person. Support means 76 is constructed in a manner to permit the effective underwater weight of apparatus 10 to be readily controlled by taking advantage of the principles of buoyancy. The effective weight of apparatus 10 is the difference between the actual or dry weight thereof and the buoyancy force created by displacement of a predetermined quantity of water therefrom. The effective weight of apparatus 10 is preselected at a value which is preferably less than about 100 pounds and most desirably approximately 25 to 50 pounds to permit such apparatus to be readily manipulated by a diver.

The buoyant force exerted on apparatus 10 is determined by the volume of air entrapped within chamber 84. This volume is initially determined by the vertical distance standpipe 182 extends into chamber 84. As apparatus 10 is lowered into the water, the water will rise upwardly within chamber 84 as air bleeds out of the chamber through standpipe 182. As soon as water has risen far enough to engage the lower end of standpipe 182, air no longer can bleed out of chamber 84 through standpipe 182 and the remaining air in chamber 84 will be entrapped, thus determining the amount of water displaced by the apparatus and the effective underwater weight of apparatus 10. As apparatus 10 is used for different applications wherein the weight of the assembly 14 varies as is necessary to fit different sizes of pipe, the length of standpipe 182 extending into chamber 84 may be varied by loosening packing means 186, shifting the pipe slightly to a new predetermined position and re-tightening the packing means so that the standpipe 182 is releasably maintained in the new predetermined position.

As apparatus 10 is lowered over the side of the ship and becomes submerged, the buoyancy force exerted thereon by the air entrapped within chamber 84 between the lower end of standpipe 182 and the top wall 82, causes apparatus 10 to have an effective weight which is desirably controlled at approximately 25 to 50 pounds. The effective weight at this point during the operation is predetermined to offset an additional desired operating characteristic, other than manipulation of apparatus 10 by a diver, which will be explained in detail as the operation proceeds. Suffice it to say at this point, that the effective weight of apparatus 10, after it first becomes submerged, should be slightly less than the weight of assembly 14.

The effective weight of apparatus 10 is sufficient to maintain cable 210 in tension as the apparatus is lowered into a position slightly above pipe 16 where apparatus 10 may be grasped by the diver 216 and manipulated into the correct anchor-driving disposition with anchors 22 and 24 on opposite sides of pipe 16. Diver 216 may then signal the operator of the lowering equipment to lower apparatus 10 until the free ends 22a and 24a contact surface 18. Diver 216 than grasps handle 132 and 178 to initiate the anchor-driving operation.

First, the left-hand end of handle 132, viewing FIG. 1, is pulled downwardly causing element 130 to rotate in a counterclockwise direction and permitting hydraulic fluid to flow through fluid lines 94 and 124. Thus, anchors 22 and 24 are rotated in opposite directions and in a direction to cause the helixes 28 and 34 to exert a downward thrust on anchors 22 and 24. It is to be noted that element 130 rotates in a counterclockwise direction, and arm 138 is caused to move downwardly by the action of pin 142 on the lower wall of slot 140 until tab 144 underlies peg 146. In this respect, it is to be noted that spring 150 causes arm 138 to be biased around pin 142 in a clockwise direction; however the cooperation between peg 146 and surface 148 causes arm 138 to rotate slightly in a counterlockwise direction to cause tab 144 and arm 138 to shift downwardly sufficiently to move tab 144 into underlying relationship to peg 146. Of course, spring 150 again will bias arm 138 in a clockwise direction and urge tab 144 and peg 146 into interengagement, preventing arm 138 from shifting upwardly.

As soon as anchors 22 and 24 begin rotating under the influence of motors 78, handle 178 is manipulated by diver 216 to cause lever 176 to rotate into its air-out position, thus bleeding air out of chamber 84 through valve 174 and pipe 172 and, therefore, chamber 84 is progressively flooded with water to cause the buoyancy of support means 76 to decrease and the effective weight thereof to increase to provide a force pushing downwardly on anchors 22 and 24 to supplement the thrust on the latter caused by the inclination of helixes 28 and 34.

The anchor-driving operation continues with the anchors being rotated in opposite directions until the bight 46 of bracket 38 is drawn into contact with the upper surface 48 of pipe 16. The disposition of apparatus 10 with respect to pipe 16 at this point may be seen in FIG. 3. As apparatus 10 moves downwardly to drive anchors 22 and 24 into the earthen surface 18, foot 166 of sensor 162 is moved into engagement with the upper surface 48 of pipe 16 and the sensor is thereby shifted upwardly relative to support means 76. Movement of the heads 106 of anchors 22 and 24 into firm contact with respective mounting means 50 shifts bight 46 of bracket member 38 into tight engagement with surface 48 of pipe 16. The upper end 168 of sensor 162 is thereby shifted toward and into engagement with inclined surface 148 on tab 144, causing arm 138 to shift in a counterclockwise direction on pin 142 and permitting tab 144 to disengage from peg 146 whereby arm 138 is released for upward movement under the influence of spring 150. Element 130 thereby rotates in a clockwise direction to discontinue flow of fluid through lines 124. The cooperation of upper end 168 and inclined surface 148 is best illustrated in FIG. 4 of the drawings. As J-shaped arm 138 shifts upwardly, tip 156 thereof is disposed to engage peg 158 to prevent shifting of arm 138 beyond a position where element 130 is maintained in its motor "Off" position. The automatic motor shutoff provided by the cooperation of sensor 162 and arm 138 with element 130, is particularly important when the diving operation is conducted at a location where the vision of diver 216 is impeded by murky water, for example.

Viewing FIG. 3, it can be seen that, as bight 46 is drawn into tight engagement with surface 48 of pipe 16, hooks 114 on drive shafts 100 are drawn into engagement with the upper surface 122 of lip 74. Viewing FIG. 7, it can be seen that the camming surface 120 on hooks 114 cooperate with surface 122 to cause the hooks to be pivoted relative to shaft 100 withdrawing tabs 116 from beneath head 106, thus releasing assembly 14.

Motors 78 are now off, and anchors 22 and 24 have been released from shafts 100, and the driver 12 is merely resting on assembly 14. Diver 216 grasps handle 178 and moves the same to cause lever 176 to shift into its air-in position. Compressed air from ship 126 is thus permitted to flow through conduit 170 and into chamber 84. Water is thereby forced out of chamber 84 at least until the level of the water in chamber 84 coincides with the lower end of standpipe 182. As mentioned previously, standpipe 182 extends into chamber 84 a distance sufficient to establish an effective weight under water for the apparatus 10 which is slightly less than the effective under-water weight of the assembly 14. Since assembly 14 is no longer attached to support means 76 after compressed air has been introduced into chamber 84 to force water out of the latter as the water level in chamber 84 falls to the lower end of standpipe 182, driver 12 will have an effective weight causing the apparatus to exhibit buoyant characteristics. That is to say, the buoyancy created by the quantity of air in chamber 84 between top wall 82 and the lower end of standpipe 182, is greater than the weight of driver 12 without the anchor 14 attached thereto. Thus, driver 12 will shift upwardly withdrawing shafts 100 from the upper ends 108 of shanks 30 and 36. As soon as upper ends 108 have been withdrawn from the bores 104 of shafts 100, diver 216 again grasps handle 178 to shift valve 174 into its air-out position to cause a slight amount of flooding to occur so that the driver 12 will exhibit a slightly positive effective weight. This causes a slight tension to be exerted on cable 210 and the driver 12 can be drawn back to the surface of the body of water 20 and lifted aboard ship 126. Without the ability to cause the apparatus to exhibit a buoyant effect, the driver 12 would have to be lifted from the assembly 14 by pulling upwardly on cable 210. If ship 126 were disposed at a slight angle (as would invariably be the case) the upper ends 108 might bind in the bores 104. As soon as the driver 12 has been lifted back aboard ship 126, another assembly 14, which has been previously assembled, may be attached to shafts 100 and the resultant apparatus 10 is again ready to be lowered into the water.

Through the use of a plurality of assemblies 14 it can be seen that a pipe 16 may be effectively anchored to an earthen surface 18 underlying the body of water 20. Pipe 16 requires neither extra thickness nor an excessively thick concrete coating thereon to produce an effective density of preferred parameters. For example, the density of the pipe can be adjusted to a value of about 1.05 which is sufficient only to cause the pipe to sink in the water and lay on the bottom. Extra concrete is not needed to keep the pipe from shifting since the anchor performs this function. Manifestly, the anchors are substantially more economical than a heavy layer of concrete on the pipe. Also, trenches are not required to prevent shifting of the pipe during severe weather conditions at the surface of the body of water. Additionally, it is important to note that the use of a pair of oppositely rotated screw anchors eliminates the need for external support for an apparatus such as 10.

It can be seen from the foregoing specification and the drawings, that all of the objects of the instant invention have been accomplished in a substantial sense and that underwater pipe-laying operations may be simplified and expedited to a great extent by utilizing the principles disclosed hereinabove.

Having thus described the invention, what is claimed as new and desired to be secured by Letters Patent is:

1. A method of securing a pipe to the earthen surface underlying a body of water through the medium of an assembly including pipe-spanning structure adapted to be held against the pipe by a pair of screw anchors having helixes thereon inclined in opposite directions, said method comprising:
   positioning the assembly over a submerged pipe laying on the earthen surface with the screw anchors facing downwardly and located in substantially upright disposition on opposite sides of the pipe;
   simultaneously rotating the anchors in opposite directions for driving the same downwardly into said earthen surface whereby the rotational torque of one anchor is offset by the rotational torque of the other anchor; and
   discontinuing rotation of the anchors after the structure has been moved into a position for anchoring the pipe to said earthen surface.

2. A pipe securing method as set forth in claim 1, wherein is included the steps of rotating said anchors about substantially parallel axes and applying an external force thereto in a direction toward said earthen surface.

3. A pipe securing method as set forth in claim 1, wherein is included the steps of sensing the proximity of said structure to said pipe and in response thereto discontinuing the rotation of said anchors after the structure has been secured tightly against the pipe.

4. A pipe securing method as set forth in claim 1, wherein is included the step of rotating said anchors at substantially the same speed.

5. A method of securing a pipe to the earthen surface underlying a body of water through the medium of an assembly including pipe-spanning structure adapted to be held against the pipe by a pair of screw anchors having helixes thereon inclined in opposite directions, said method comprising:
   lowering the assembly into overlying relationship to a submerged pipe laying on said earthen surface, with the structure spanning the pipe and said screw anchors facing downwardly and located in substantially upright disposition on opposite sides of the pipe;
   providing sufficient buoyant support for the assembly to permit ready handling thereof by a diver adjacent the pipe;
   simultaneously rotating the anchors in opposite directions for driving the same into said earthen surface while at the same time decreasing the buoyant support for said assembly, whereby during insertion of the anchors, the rotational torque of one anchor is offset by the rotational torque of the other anchor; and
   discontinuing rotation of the anchors after the structure has been moved into a position for anchoring the pipe to said earthen surface.

6. A pipe securing method as set forth in claim 5, wherein is included the steps of displacing a predetermined quantity of water by entrapping air at a submerged level to provide said buoyancy for the assembly and releasing the air to decrease the buoyant support during said rotating step.

7. A pipe securing method as set forth in claim 6, wherein is included the step of displacing a sufficient quantity of said water to cause the assembly to have an effective weight of les than about 100 pounds.

8. A method of securing a pipe to the earthen surface underlying a body of water through the medium of an assembly including pipe-spanning structure adapted to be held against the pipe by a pair of screw anchors having helixes thereon inclined in opposite directions, said method comprising:
   connecting a driver to the anchors for rotating the latter simultaneously in opposite directions, said driver having a chamber therein for trapping air;

lowering the driver with said assembly connected thereto into the water with a sufficient quantity of air trapped in said chamber to cause the driver and assembly to displace a volume of water having a weight slightly less than the dry weight of the driver and assembly and permit the latter to gravitate through the water while exhibiting a substantially reduced effective weight;

positioning the driver and the assembly over a submerged pipe laying on the earthen surface with the structure spanning the pipe and with the screw anchors facing downwardly and located in substantially upright disposition on opposite sides of the pipe;

activating said driver to rotate the anchors simultaneously in opposite directions for driving the same into said earthen surface while at the same time releasing asid trapped air to decrease the amount of water displaced and cause the effective weight of the submerged driver and assembly to increase and impart a downward force on said screw anchors; and discontinuing rotation of the anchors after the structure has been moved into a position for anchoring the pipe to said earthen surface.

9. A pipe securing method as set forth in claim 8, wherein is included the steps of sensing the proximity of said structure to said pipe and in response thereto deactivating said driver to discontinue the rotation of said screw anchors after the structure has been tightly secured against the pipe, disconnecting the driver from the screw anchors and lifting the driver to the surface of the water.

10. A pipe securing method as set forth in claim 9, wherein is included the step of forcing a sufficient quantity of air into said chamber after said disconnection step to increase the amount of water displaced by the driver to a level sufficient to cause the effective weight of the submerged driver to decrease to a point where the driver exhibits a buoyant effect whereby the driver shifts upwardly away from said assembly.

11. A pipe securing method as set forth in claim 8, wherein is included the step of sensing the proximity of said structure to said pipe as the anchors are rotated to permit automatic interruption of further rotation thereof.

12. A pipe securing method as set forth in claim 8, wherein is included the step of controlling the operation of said driver to cause said anchors to be rotated at substantially the same speed regardless of the relative resistance to rotation encountered by respective anchors.

13. A pipe securing method as set forth in claim 8, wherein is included the steps of rotating said anchors about substantially parallel axes while maintaining the same in parallelism by guiding each anchor at a pair of zones spaced longitudinally of the anchor.

14. A method of securing a pipe to the earthen surface underlying a body of water through the medium of pipe-securing structure adapted to be held in place by screw anchors driven into the earthen surface by a driver operably coupled to a ship, said method comprising:

anchoring the ship above the pipe by placing a first cable between the bow of the ship and a zone on the earthen surface adjacent the pipe ahead of the ship and another cable between the aft section of the ship and a zone on the earthen surface adjacent the pipe behind the ship to maintain the ship in a fixed location relative to the pipe;

placing a structure and the driver in overlying relationship with respect to the submerged pipe in a position substantially beneath the ship and with the anchors facing downwardly and located in substantially upright disposition on opposite sides of the pipe;

rotating said anchors simultaneously in opposite directions to drive the anchors into the earthen surface adjacent said pipe, said rotation of the anchors being discontinued when the structure has been moved into a position to secure the structure against the pipe and the latter against the earthen surface; and moving said ship to a new securing location while maintaining the same substantially above said pipe by drawing in one cable while playing out the other cable, whereby another structure may be secured against the pipe and the latter against the earthen surface at said new position.

15. A pipe securing method as set forth in claim 14, wherein is included the step of locating said zones on the earthen surface sufficiently far apart to permit the placement of a substantial number of individual structures in normally spaced positions along the pipe while maintaining said ship between the zones.

16. A pipe securing method as set forth in claim 15, wherein is included the steps of predetermining the distance said structures are to be placed apart longitudinally of the pipe and marking said pipe to indicate each placement position before submerging the pipe.

17. An anchor driving device for use in securing a pipe to the earthen surface underlying a body of water through the medium of an assembly including pipe-spanning structure adapted to be held against the pipe by a pair of screw anchors having oppositely inclined helixes thereon, said device comprising:

a submersible housing;

coupling means on the housing adapted to releasably receive the normally uppermost ends of the screw anchors and to support the assembly for positioning of the same over the submerged pipe with the screw anchors facing downwardly and located in substantially upright disposition on opposite sides of the pipe; and motor means carried by the housing and operably coupled to said coupling means for rotating the latter simultaneously in opposite directions to permit simultaneous driving of said anchors into the earthen surface, whereby the rotational torque of one anchor is offset by the rotational torque of the other anchor.

18. The invention of claim 17, wherein said housing includes chamber-defining means configured to trap a quantity of air therein for controlling the buoyancy of the device after being submerged.

19. The invention of claim 18, wherein said chamber-defining means includes side walls and a top wall, the chamber being open at the bottom, there being elongated standpipe means extending generally downwardly through said top wall communicating the chamber with the water above said top wall and permitting water to rise in said chamber at least as far as the lowermost extremity of said standpipe means.

20. The invention of claim 19, wherein is provided adjustable packing means on said top wall mounting said standpipe means therethrough, said packing means being operable upon loosening to permit said standpipe means to be shifted longitudinally, and upon tightening to releasably maintain the standpipe means in a position with the lowermost extremity thereof at a predetermined distance below said top wall.

21. The invention of claim 18, wherein is included conduit means on the chamber-defining means for communicating the chamber with a source of pressurized air, there being control means in the conduit means for controlling introduction of air into the chamber and bleeding of air out of the chamber and thereby the buoyancy of the support means, said control means having a lever shiftable between air-in, air-out, and hold positions, said lever having structure thereon disposed in spaced relationship with respect to said support means permitting remote control of the buoyancy of the support means by a diver.

22. The invention of claim 17, wherein is included control mechanism supported by said housing and operably coupled to said motor means for controlling the actuation of the latter and having an element shiftable between motor on and motor off positions, said element having structure thereon disposed in spaced relationship with respect to said support means permitting remote control of said motor by a diver.

23. The invention of claim 22, wherein is included latch means on the support means and the element for releasably maintaining the latter in said motor on position, there being spring means operably connected with the element and biasing the same toward the motor off position thereof and a shiftable, elongated sensor located to contact the pipe as the anchors become fully driven into said earthen surface and be shifted thereby toward said latch means for releasing the latter and permitting the element to be shifted toward the motor off position thereof under the influence of the spring means.

24. The invention of claim 23, wherein said latch means includes an elongated arm pivotally mounted on said element and a peg extending toward said arm from the support means, said arm having a tab thereon located for engagement with said peg, said spring means urging said peg and said ear into engagement, there being a camming surface on said arm disposed to be engaged by said sensor as the latter is shifted by the pipe, said arm being located for pivotal action on the element by the engagement of said sensor and said surface whereby said peg and said tab are disengaged to permit said shifting of the element toward the motor off position thereof.

25. An assembly for anchoring a pipe to the earthen surface underlying a body of water comprising:
an elongated bracket member adapted to be placed across the pipe in spanning relationship thereto and having an anchor mounting flange extending outwardly from each of the two opposite ends thereof; and
an elongated anchor rotatably mounted on each of said flanges in substantially perpendicular relationship thereto with the longitudinal axes of the anchors being generally parallel, each anchor having a helix thereon for causing the anchor to be drawn downwardly into said earthen surface as the same is rotated during installation thereof to thereby permit firm clamping of the bracket member against the pipe for holding the latter against the earthen surface, the helix on one anchor being inclined in the opposite direction from the helix on the other anchor and means on the anchors for simultaneous driving thereof downwardly by rotation in opposite directions.

26. An assembly as set forth in claim 25, wherein said bracket member includes a U-shaped central section having a pair of spaced-apart, substantially parallel legs and a bight interconnecting the legs, said flanges being disposed for extension laterally from the free end of a respective leg and in a direction generally away from said bight.

27. An assembly as set forth in claim 26, wherein said bight is generally arcuate and configured to complementally engage the outer surface of the pipe with the legs extending downwardly therefrom on opposite sides of the pipe, said flanges being located to contact said earthen surface and extend laterally thereon in opposite directions away from the pipe.

28. An assembly as set forth in claim 27, wherein each of said anchors includes a helix mounting portion and a shank portion extending therefrom in axially aligned relationship thereto, each flange having an opening therein receiving the shank portion of one of the anchors, said helix mounting portions extending away from the bracket in the same general direction.

29. An assembly as set forth in claim 28, wherein is provided guide means slidably receiving said anchors for maintaining the latter in substantially mutually parallel relationship for extension in a direction substantially perpendicular with respect to said flanges.

30. An assembly as set forth in claim 25, wherein each of said anchors includes a helix mounting portion and a shank portion extending therefrom in axially aligned relationship thereto, each flange having an opening therein receiving the shank portion of one of the anchors, said helix mounting portions extending away from the bracket in the same general direction.

31. An assembly as set forth in claim 30, wherein each shank portion has a head located thereon remote from the helix mounting portion thereof, said flanges being disposed between the heads and the helix mounting portions, there being means on each flange engageable with the corresponding head for causing the member to be forced against the pipe as the anchors are driven into said earthen surface.

32. Apparatus for securing a pipe to the earthen surface underlying a body of water comprising:
a submersible assembly including pipe-spanning structure and provided with a pair of parallel depending screw anchors having oppositely inclined helixes thereon for holding the structure tightly against the pipe;
means for supporting the assembly to permit positioning of the same over the submerged pipe with the screw anchors located in substantially upright disposition on opposite sides of the pipe; and
motor means carried by the support means and operably coupled with the anchors for rotating the latter simultaneously in opposite directions for driving the same downwardly into the earthen surface, whereby the rotational torque of one anchor is offset by the rotational torque of the other anchor.

33. Apparatus as set forth in claim 32, wherein said motor means has a pair of elongated, spaced-apart drive shafts normally disposed to extend toward the earthen surface, said motor means being operable to simultaneously rotate the shafts in opposite directions, said anchors having respective shank portions, each drive shaft having an axially aligned bore therein receiving a respective shank, each shank and each bore being tranversely, complementally polygonally configured.

34. Apparatus as set forth in claim 33, wherein said structure includes an elongated bracket adapted to be placed across the pipe in spanning relationship thereto and having an anchor mounting flange extending outwardly from each end thereof, there being a circular opening in each flange receiving a respective anchor, each flange being provided with a sleeve rotatably mounted in the opening, said sleeves having a central, transversely polygonal aperture therethrough, complementally receiving respective shanks therein.

35. Apparatus as set forth in claim 34, wherein each shank has a head section disposed adjacent the shaft, said sleeves being provided with annular lips engaging the flanges and preventing shifting of respective sleeves relative to the corresponding flange in a direction toward the earthen surface, said head sections and said lips being interengageable for causing the bracket to be drawn tightly against the pipe as the anchors are driven into the earthen surface.

36. Apparatus as set forth in claim 35, wherein is provided hook means pivotally mounted on each shaft and releasably engaging the head section of a respective shank for preventing movement of the latter relative to the shaft, each hook means having a camming surface engageable with said lip after the anchors have been fully driven into the earthen surface for pivoting the hook means and releasing the shank.

37. Apparatus as set forth in claim 34, wherein each of said sleeves includes a pair of separate sections located on opposite sides of the respective shank and having opposed, complementally mated inner surfaces extending longitudinally of the shank, each of said sections having a plurality of walls defining a recess extending across the inner surface thereof, the recess of one section being located in opposed relationship with respect to the recess of the corresponding section, said recesses defining said aperture.

References Cited

UNITED STATES PATENTS

| | | | |
|---|---|---|---|
| 1,320,750 | 11/1919 | Formiglia | 61—69 X |
| 2,086,141 | 8/1937 | Spataro | 175—122 X |
| 2,864,633 | 12/1958 | Mackie | 52—157 X |
| 3,004,392 | 10/1961 | Symmank | 61—72.4 |
| 3,103,790 | 9/1963 | Popich | 61—72.4 |
| 3,148,739 | 9/1964 | Mattingly et al. | 61—53.68 X |

FOREIGN PATENTS

| | | |
|---|---|---|
| 12,832 | 1886 | Great Britain. |
| 33,674 | 1/1921 | Norway. |

EARL J. WITMER, *Primary Examiner.*